Figure 1:
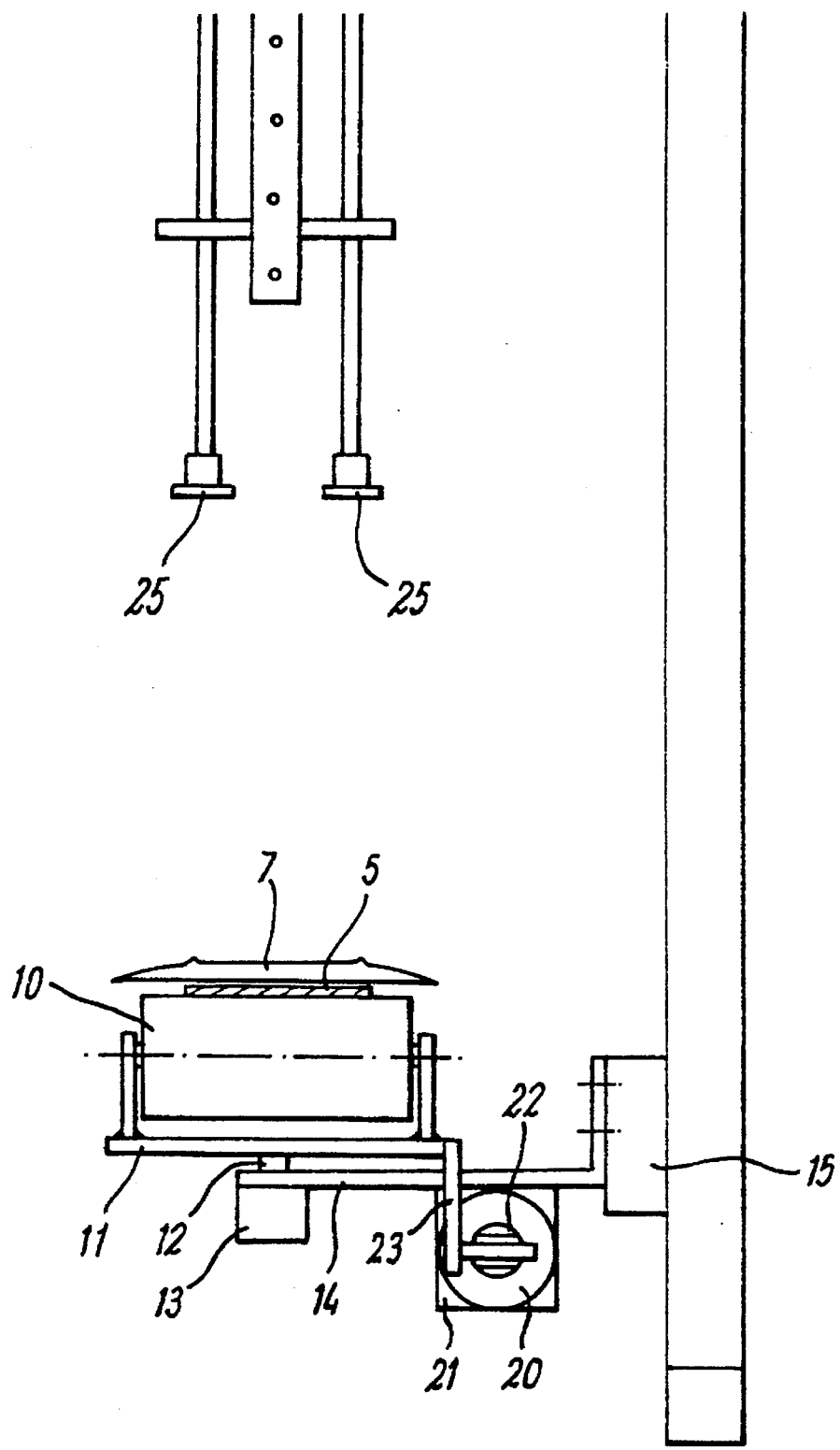

United States Patent [19]
Hulse et al.

[11] Patent Number: 5,513,742
[45] Date of Patent: May 7, 1996

[54] METHOD AND DEVICE FOR CONTROLLING BELT TRACKING

[75] Inventors: David K. Hulse; Norman J. Lawton, both of Stoke-on-Trent, England

[73] Assignee: Royal Doulton (UK) Limited, Stoke-on-Trent, England

[21] Appl. No.: 408,909

[22] Filed: Mar. 22, 1995

[30] Foreign Application Priority Data

Mar. 24, 1994 [GB] United Kingdom ............... 9405818

[51] Int. Cl.⁶ .................................................. B65G 39/16
[52] U.S. Cl. ..................... 198/810.03; 198/807
[58] Field of Search ............................. 198/806, 807, 198/810.03; 226/20; 474/102, 103, 104

[56] References Cited

U.S. PATENT DOCUMENTS

| | | | |
|---|---|---|---|
| 3,108,727 | 10/1963 | Farber | 226/20 |
| 3,254,300 | 5/1966 | Prell | 226/20 X |
| 3,956,632 | 5/1976 | Hall et al. | 198/810.03 X |
| 4,506,782 | 3/1985 | Jeanneret et al. | 198/806 |
| 5,096,044 | 3/1992 | Biebel | 198/807 X |
| 5,117,969 | 6/1992 | Roth | 198/807 |
| 5,248,027 | 9/1993 | Kluger et al. | 198/807 X |
| 5,252,991 | 10/1993 | Storlie et al. | 226/20 X |
| 5,324,957 | 6/1994 | Hejazi | 198/807 X |

FOREIGN PATENT DOCUMENTS

| | | |
|---|---|---|
| 1117531 | 6/1965 | United Kingdom . |
| 2206553 | 7/1988 | United Kingdom . |

*Primary Examiner*—James R. Bidwell
*Attorney, Agent, or Firm*—Watts, Hoffmann, Fisher & Heinke Co.

[57] ABSTRACT

A method and apparatus for use in sensing and correcting wander in a conveyor belt system employed to transport articles of greater width than the width of the belt itself, comprising for sensing deviations from a mean belt edge position at at least one side of the belt, generating a signal in response to such deviations, timing the duration of the signal, and an actuator operable to adjust tracking of the belt when the signal is generated for a period of time greater than that taken for the projecting portion of an article carried on the belt to move past the sensor.

9 Claims, 2 Drawing Sheets

METHOD AND DEVICE FOR CONTROLLING BELT TRACKING

This invention relates to a method and means for controlling tracking of conveyor belts.

Conveyor belts used for the transportation of articles are generally entrained over a series of rollers which support the belt during its travel but to which the belt is otherwise unattached. Such conveyor belts exhibit a tendency to "wander", that is for the belt to become displaced axially of the supporting rollers, and various means have previously been proposed for correcting the "tracking" of conveyor belts to prevent wander to an extent which results in sections of the belt moving clear of the pulleys and being unsupported.

In the case of solid belts made of rubber or similar materials, tracking is usually attained by use of "crowned" rollers which are of slightly larger diameter at their central region compared with their ends. As a result that the bell is slightly curved and this eliminates the tendency to wander and produces satisfactory tracking. In some applications however the use of solid belts is inappropriate for a variety of reasons and belts of mesh or other lighter structure have to be employed. Tracking of such belts cannot be satisfactorily achieved using crowned rollers due to the structure of the belt being laterally weak, and belt wander therefore remains a problem. This is particularly the case in situations where the belt is employed to transport articles which cannot be precisely centrally located on the belt so that it is subjected to off-centre loading which produces tilt and increases the tendency to wander. The problem of correcting tracking is increased if, in use, articles transported on the belt project beyond the edges of the belt.

The invention provides a method of sensing and correcting wander in a conveyor belt system employed transport articles of greater width than the width of the belt itself, comprising sensing deviations from a mean belt edge position at at least one side of the belt, generating a signal in response to said deviations, timing the duration of said signal and actuating means for adjusting tracking of the belt when said signal is generated for a period of time greater than that taken for the projecting portion of an article carried on the belt to move past the means by which said sensing is effected.

The invention also provides apparatus for use in sensing and correcting wander in a conveyor belt system employed to transport articles of greater width than the width of the belt itself, comprising means for sensing deviations from a mean belt edge position at at least one side of the belt, means for generating a signal in response to said deviations, means for timing the duration of said signal, and actuating means operable to adjust tracking of the belt when said signal is generated for a period of time greater than that taken for the projecting portion of an article carried on the belt to move past said sensing means.

Preferably said sensing means is adapted to sense the position of both edges of said belt. The sensing means may comprise a pair of infra-red detectors disposed above or below the belt and in alignment with its respective edges.

Preferably said tracking roller is rotatably mounted in support means pivotally movable about a vertical axis aligned with the centre line of the belt.

Preferably said actuating means comprises an air cylinder operatively connected between said support means and a fixed mounting location and operable to rotate said mounting means about said vertical axis in response to signals generated by said sensing means.

Figure 2:
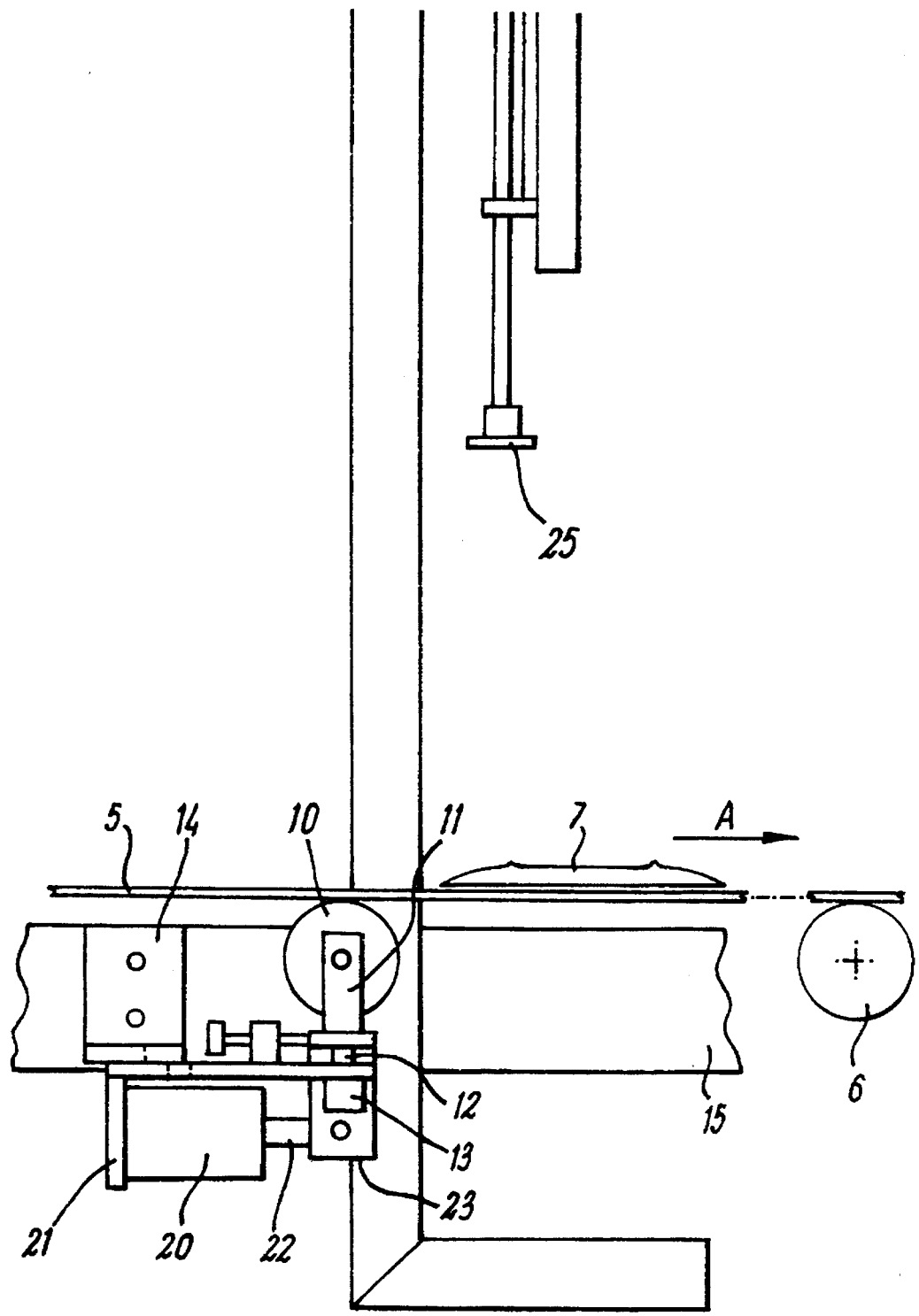

An embodiment of the invention will now be described, by way of example only, with reference to the accompanying drawings, in which:

FIG. 1 is an end view of a belt wander detecting and correcting means according to one embodiment of the invention; and FIG. 2 is a side view of the apparatus shown in FIG. 1.

Referring to the drawings, there is shown a conveyor belt 5 supported on rollers 6 and adapted to be driven by means (not shown) in the direction of arrow 'A' in FIG. 2. In use a series of ceramic plates, one of which is shown at 7, are supported in an inverted position on and are transported along by the belt.

A tracking roller 10 is mounted beneath and supports the belt in a position between adjacent rollers 6. The tracking roller is freely rotatably mounted on a support bracket 11 pivotally movable about a vertical shaft 12 freely rotatable in a collar 13 carried by a bracket 14 mounted to a fixed portion 15 of the frame of the machine. The axis of the shaft 12 lies mid-way between the ends of the roller 10 and on the centreline of the belt 5.

An air cylinder 20 is carried by a depending portion 21 of the bracket 14 and has a piston rod 22 projecting from the cylinder and connected to a depending portion 23 of the bracket 11. Thus on actuation of the air cylinder 20, the bracket 11 is rotated about the shaft 12 to thereby alter the angular position of the axis of the roller 10 relative to the direction of movement of the conveyor 5.

A pair of infra-red sensing units 25 are mounted in fixed positions above the conveyor 5 and are spaced apart by a distance equal to the width of the conveyor, one unit being vertically aligned with each edge of the conveyor when the latter is running in its normal position. The sensing units 25 are connected through an electrical circuit to valve means (not shown) controlling the supply of air to the pneumatic cylinder 20.

In the absence of the plates 7, if the belt maintained its mean position laterally of the tracking roller 10, no signals would be generated by the sensing units 25. However if the conveyor moved away from its mean position on the roller 10, the sensing units 25 would detect movement of the edges of the conveyor and transmit a signal through the electrical control circuit and valve means to the cylinder 20. The cylinder is then extended or retracted to pivot the bracket about the shaft 12 and alter the angular position of the roller relative to the direction of movement of the conveyor belt. If the belt moved to the left as viewed in FIG. 1 of the drawings, the left hand sensor 25 would be energised and this would generate a signal operative to rotate the roller 10 in a direction to cause the belt to move to the right. Conversely if the belt moved downwardly to the right of its mean position, the right hand sensor 25 would be energised and would produce a signal tending to rotate the roller 10 in the opposite direction and constrain the belt to move to the left as viewed in FIG. 1.

However the plates 7 carried by the belt 5 are of greater width than the width of the belt itself. Hence if the sensors 25 were continuously energised they would sense the projecting edges of successive articles and produce false signals where tracking correction may be unnecessary. To avoid this a timer is incorporated in the electrical circuit interconnecting the sensors 25 and the valve means controlling the supply of air to the cylinder 20. This times the duration or wander signals produced by the sensors 25 and actuates said valve means only in cases where a wander signal is generated for a period of time greater than the time taken for the portion or an article projecting beyond the conveyor to pass the sensors. In this way signals generated by the projecting portions of the articles do not produce corrective movement of the tracking roller, but signals of longer duration do.

By arranging for the time delay to correspond to the period taken for projecting portions of the largest articles to be carried by the conveyor to pass the sensors, the system operates satisfactorily when articles having projecting portions of lesser extent are transported without requiring re-setting of the timer.

By virtue of the arrangement described tracking of the conveyor belt is essentially continuously monitored and corrective action taken by adjusting the angular position of the tracking roller to constrain the belt to move back towards its mean running position. The arrangement is of essentially simple construction and operation and not liable to malfunctioning and provides a simple and effective means of detecting and correcting belt wander where the articles transported project beyond the edges of the belt.

Various modifications may be made without departing from the invention. For example, the means of sensing movement of the belt may be altered and alternative means for adjusting the angular position of the roller may be employed if desired. Moreover while reference has been made herein to belts for transporting ceramic articles such as plates, saucers or the like, the invention is equally applicable to conveyor belts used to transport other articles.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of sensing and correcting wander in a conveyor belt system employed to transport articles of greater width than the width of the belt itself, comprising sensing deviations from a mean belt edge position at at least one side of the belt, generating a signal in response to said deviations, timing the duration of said signal and actuating means for adjusting tracking of the belt when said signal is generated for a period of time greater than that taken for the projecting portion of an article carried on the belt to move past the means by which said sensing is effected.

2. A method according to claim 1 wherein said period of time corresponds to the time taken for the projecting portion of the largest article to be carried on the conveyor belt to pass said sensing means.

3. A method according to claim 1 wherein the position of both edges of the belt is sensed.

4. Apparatus for use in sensing and correcting wander in a conveyor belt system employed to transport articles of greater width than the width of the belt itself, comprising means for sensing deviations from a mean belt edge position at at least one side of the belt, means for generating a signal in response to said deviations, means for timing the duration of said signal, and actuating means operable to adjust tracking of the belt when said signal is generated for a period of time greater than that taken for the projecting portion of an article carried on the belt to move past said sensing means.

5. Apparatus according to claim 4 wherein said sensing means is adapted to sense the position of both edges of said belt.

6. Apparatus according to claim 4 wherein said sensing means comprises a pair of infra-red detectors disposed above or below the belt and in alignment with its respective edges.

7. Apparatus according to claim 4 wherein said tracking roller is rotatably mounted in support means pivotally movable about a vertical axis aligned with the normal centre line of the belt.

8. Apparatus according claim 4 wherein said actuating means comprises an air cylinder operatively connected between said support means and a fixed mounting location and operable to rotate said support means about said vertical axis in response to signals generated by said sensing means.

9. Apparatus according to claim 4 wherein said support means and said actuating means are mounted on a common mounting member adapted to be mounted on a fixed mounting location.

\* \* \* \* \*